US010589253B2

(12) United States Patent
Evans et al.

(10) Patent No.: US 10,589,253 B2
(45) Date of Patent: Mar. 17, 2020

(54) METHOD FOR PREPARING A SORBENT

(71) Applicant: JOHNSON MATTHEY PUBLIC LIMITED COMPANY, London (GB)

(72) Inventors: Matthew James Evans, Durham (GB); Matthew David Gwydion Lunn, Durham (GB); Martin Graham Partridge, Hilton Cleveland (GB); Christopher John Young, Hartlepool Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 488 days.

(21) Appl. No.: 15/035,807

(22) PCT Filed: Dec. 4, 2014

(86) PCT No.: PCT/GB2014/053607
§ 371 (c)(1),
(2) Date: May 11, 2016

(87) PCT Pub. No.: WO2015/092360
PCT Pub. Date: Jun. 25, 2015

(65) Prior Publication Data
US 2016/0288083 A1   Oct. 6, 2016

(30) Foreign Application Priority Data

Dec. 18, 2013 (GB) .................................. 1322466.2

(51) Int. Cl.
*B01J 20/02* (2006.01)
*B01J 20/06* (2006.01)
*B01J 20/08* (2006.01)
*B01J 20/16* (2006.01)
*B01J 20/28* (2006.01)
*B01J 20/30* (2006.01)
*B01D 53/64* (2006.01)
*B01J 20/10* (2006.01)
*B01D 53/02* (2006.01)
*B01D 15/08* (2006.01)
*B01D 53/04* (2006.01)
*B01J 2/12* (2006.01)
*B01J 2/28* (2006.01)

(52) U.S. Cl.
CPC .......... *B01J 20/0237* (2013.01); *B01D 15/08* (2013.01); *B01D 53/02* (2013.01); *B01D 53/04* (2013.01); *B01D 53/64* (2013.01); *B01J 2/12* (2013.01); *B01J 2/28* (2013.01); *B01J 20/0285* (2013.01); *B01J 20/06* (2013.01); *B01J 20/08* (2013.01); *B01J 20/103* (2013.01); *B01J 20/16* (2013.01); *B01J 20/2803* (2013.01); *B01J 20/28004* (2013.01); *B01J 20/3007* (2013.01); *B01J 20/3028* (2013.01); *B01J 20/3042* (2013.01); *B01J 20/3085* (2013.01); *B01D 2253/104* (2013.01); *B01D 2253/1128* (2013.01); *B01D 2256/16* (2013.01); *B01D 2256/20* (2013.01); *B01D 2256/24* (2013.01); *B01D 2256/245* (2013.01); *B01D 2257/602* (2013.01); *B01D 2258/025* (2013.01)

(58) Field of Classification Search
CPC ... B01J 20/0237; B01J 2/12; B01J 2/28; B01J 20/0285; B01J 20/06; B01J 20/08; B01J 20/103; B01J 20/16; B01J 20/20; B01J 20/28004; B01J 20/2803; B01J 20/3007; B01J 20/3028; B01J 20/3042; B01J 20/3085; B01D 15/08; B01D 53/02; B01D 53/04; B01D 53/64
See application file for complete search history.

(56) References Cited

U.S. PATENT DOCUMENTS

| 5,245,106 A | 9/1993 | Cameron et al. |
| 2007/0122327 A1 | 5/2007 | Yang et al. |
| 2013/0152788 A1 | 6/2013 | Turbeville et al. |

FOREIGN PATENT DOCUMENTS

| WO | 2008/020250 A1 | 2/2008 |
| WO | 2009/101429 A1 | 8/2009 |
| WO | 2009/145877 A1 | 12/2009 |
| WO | WO 2010/061212 A1 | 6/2010 |
| WO | 2014/016560 A1 | 1/2014 |

OTHER PUBLICATIONS

Ohtani, et al: "Synthesis of binary copper chalcogenides by mechanical alloying", Materials Research Bulletin, Elsevier, Kidlington, GB, vol. 30, No. 12, Dec. 1, 1995 (Dec. 1, 1995), pp. 1495-1504, XP022270409, ISSN: 0025-5408, DOI: 10.1016/0025-5408(95)00155-7.
International Search Report, dated Mar. 30, 2015, from corresponding PCT Application.

*Primary Examiner* — Melvin C. Mayes
*Assistant Examiner* — Michael Forrest
(74) *Attorney, Agent, or Firm* — BakerHostetler

(57) ABSTRACT

A method is described for preparing a sorbent including the steps of:
(i) mixing together a particulate copper sulphide material, a particulate support material and one or more binders,
(ii) shaping the mixture, and
(iii) drying the shaped mixture to form a dried sorbent.

19 Claims, No Drawings

METHOD FOR PREPARING A SORBENT

This invention relates to a method for preparing a sorbent, in particular a method for preparing sorbents comprising copper sulphide.

Copper sulphide containing sorbents are useful in removing heavy metals from fluid streams. Heavy metals such as mercury are found in small quantities in fluid streams such as hydrocarbon or other gas and liquid streams. Arsenic and antimony may also be found in small quantities in hydrocarbon streams. Mercury, in addition to its toxicity, can cause failure of aluminium heat exchangers and other processing equipment. Therefore there is a need to efficiently remove these metals from fluid streams, preferably as early as possible in the process flowsheet.

Copper sulphide is conventionally formed in the sorbents either in situ by reaction with hydrogen sulphide ($H_2S$) present in the fluid stream, or by pre-sulphiding again with hydrogen sulphide. This reaction is depicted for copper oxide as follows:

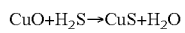

$$CuO + H_2S \rightarrow CuS + H_2O$$

Similarly, where copper hydroxycarbonate materials are used, both $CO_2$ and $H_2O$ are evolved.

WO2009/101429 discloses a method for making the absorbent comprising the steps of: (i) forming a composition comprising a particulate copper compound capable of forming copper sulphide, a particulate support material, and one or more binders, (ii) shaping the composition to form an absorbent precursor, (iii) drying the absorbent precursor material, and (iv) sulphiding the precursor to form the absorbent. The sulphiding agent used to sulphide the absorbent precursor may be one or more sulphur compounds such as hydrogen sulphide, carbonyl sulphide, mercaptans and polysulphides, or mixtures of these. Hydrogen sulphide is preferred.

It was believed that the conversion of the copper compounds was necessary in order to provide a sorbent with suitable physical properties and effective capacity for heavy metals.

However, the sulphiding method using these sulphiding agents if not carefully controlled can lead to in-homogeneous product and impaired physical properties. Moreover hydrogen sulphide is a toxic gas and control measures are necessary for sulphiding at large scale. Therefore there is a need to seek alternative methods that are inherently safer, simpler and offer improved product homogeneity.

Accordingly the invention provides a method for preparing a sorbent comprising the steps of:
 (i) mixing together a particulate copper sulphide material, a particulate support material and one or more binders,
 (ii) shaping the mixture, and
 (iii) drying the shaped mixture to form a dried sorbent.

The invention further provides a sorbent obtainable by the method and the use of the sorbent in removing heavy metals from heavy metal-containing fluid streams.

By "sorbent" we include absorbent and adsorbent.

By "heavy metal" we include mercury, arsenic selenium, cadmium and antimony.

The particulate copper sulphide used to prepare the sorbent may be sourced commercially or may be prepared by a number of methods. Suitable methods include roasting of copper or a copper compound with elemental sulphur, solvothermal processes, hydrothermal processes (e.g. microwave irradiation), electrodeposition techniques, precipitation of copper sulphide from solution, sulphiding of copper compounds using hydrogen sulphide, electron irradiation or by a mechanochemical process in which powdered copper metal is mixed with elemental sulphur under conditions that cause the elemental copper and elemental sulphur to react to form one or more copper sulphides. Such methods are described in the *Materials Research Bulletin*, vol 30, no 12, p 1495-1504, 1995.

Copper sulphides that may be used include Copper (II) sulphide, CuS, (covellite) and/or substoichiometric copper sulphides, e.g. of formula $Cu_{2-x}S$ where x is 0-1, such as $Cu_9S_5$ (digenite). One or more copper sulphides may be used. Copper sulphides high in CuS are preferred, and the overall S:Cu atomic ratio of the particulate copper sulphide is preferably ≥0.8, more preferably ≥0.9, most preferably ≥0.95. Desirably, essentially all of the sulphided copper in the sorbent is in the form of copper (II) sulphide, CuS. The particulate copper sulphide may be in the form of a powder, preferably a powder with an average particle size, i.e. $D_{50}$, in the range 5-100 μm, especially 5-50 μm.

The dried sorbent preferably comprises 10-75% by weight, preferably 15-50% by weight, of copper sulphide (expressed as CuS).

The particulate support material may be any inert support material suitable for use in preparing sorbents. Such support materials include alumina, metal-aluminate, silica, silicon carbide, titania, zirconia, zinc oxide, aluminosilicates, zeolites, metal carbonate, carbon, or a mixture thereof. The support material offers a means to adapt the physical properties of the sorbent to the duty. Thus the surface area, porosity and crush strength of the sorbent may suitably be tailored to its use. Furthermore, the presence of support particles can increase the strength and durability of the sorbent composition by acting as a diluent. The particulate support materials are desirably oxide materials such as aluminas, titanias, zirconias, silicas and aluminosilicates, or mixtures of two or more of these. Hydrated oxides may also be used, for example alumina trihydrate or boehmite. Particularly suitable particulate support materials are aluminas and hydrated aluminas, especially alumina trihydrate. The particulate support material is desirably in the form of a powder, more preferably a powder with a $D_{50}$ particle size in the range 1-100 μm, especially 5-20 μm.

The dried sorbent preferably comprises 20-60% by weight of the particulate support material.

Binders that may be used to prepare the shaped sorbent include clay binders such as bentonite, sepiolite, minugel and attapulgite clays; cement binders, particularly calcium aluminate cements such as ciment fondu; and organic polymer binders such as cellulose binders, or a mixture thereof. Particularly strong shaped units may be formed where the binder is a combination of a cement binder and a clay binder. In such materials, the relative weights of the cement and clay binders may be in the range 1:1 to 3:1 (first to second binder). The total amount of the binder in the dried sorbent may be in the range 5-30% by weight. The one or more binders are desirably in the form of powders, more preferably powder with a $D_{50}$ particle size in the range 1-100 μm, especially 1-20 μm.

Other components may also be present in the sorbent to enhance the physical properties of the sorbent. However, where high water-tolerance of the sorbent is required, the metal sulphide content of the sorbent, other than copper sulphide, is preferably ≤5% by weight, more preferably ≤1% wt, most preferably ≤0.5% wt, especially ≤0.1% wt (based on the sulphided composition).

In a preferred embodiment, the sorbent consists essentially of copper sulphide, a support material and one or more binders. In a particularly preferred embodiment, the sorbent comprises 10-75% by weight of CuS, 20-60% by weight of a particulate support material, and the remainder one or more binders, wherein the metal sulphide content of the sorbent, other than copper sulphide, is ≤5% by weight.

The mixture of copper sulphide, particulate support and one or more binders is shaped and dried to form a sorbent. Shaping may be by pelleting, extruding or granulating. Hence, sorbent pellets may be formed by moulding a powder composition, generally containing a material such as graphite or magnesium stearate as a moulding aid, in suitably sized moulds, e.g. as in conventional tableting operation. Alternatively, the sorbent extrudates may be formed by forcing a suitable composition and often a little water and/or a moulding aid as indicated above, through a die followed by cutting the material emerging from the die into short lengths. For example extrudates may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length. Alternatively, sorbent granules, in the form of agglomerates, may be formed by mixing a powder composition with a little liquid, such as water, insufficient to form a slurry, and then causing the composition to agglomerate into roughly spherical granules in a granulator. The amount of liquid added will vary depending upon the porosity and wettability of the components, but may be 0.1 to 0.5 ml/g of support mixture. Aqueous or non-aqueous liquids may be used, but water is preferred. Minimizing the amount of liquid used advantageously reduces the drying time of the sorbent and may reduce the formation of undesirable copper sulphates. Similarly, granulating the mixture under a dry and/or non-oxidising atmosphere, such as oxygen-free nitrogen, may also help reduce the formation of sulphates. Suitable granulator equipment is available commercially. The liquid may be conveniently added by spraying.

The pellets, extrudates or granules preferably have a length and width in the range 1 to 25 mm, with an aspect ratio (longest dimension divided by shortest dimension)≤4.

The different shaping methods have an effect on the surface area, porosity and pore structure within the shaped articles and in turn this often has a significant effect on the sorption characteristics and on the bulk density. Thus beds of sorbents in the form of moulded pellets may exhibit a relatively broad absorption front, whereas beds of granulated agglomerates can have a much sharper absorption front: this enables a closer approach to be made to the theoretical absorption capacity. On the other hand, agglomerates generally have lower bulk densities than tableted compositions. Furthermore, in view of the presence of copper sulphide, methods involving small amounts of water are preferred to avoid possible sulphate formation, which is undesirable. Accordingly, it is preferred to make the shaped units in the form of agglomerates and thus a preferred shaping method involves granulating the mixture of copper sulphide, particulate support and binder in a granulator. Granules with a diameter in the range 1-15 mm are preferred.

The shaped sorbent is dried. Conventional drying equipment may be used. Drying temperatures up to 120° C. may be used. Drying times may be in the range 0.25-16 hours. Drying under a non-oxidising atmosphere such as dry nitrogen may reduce sulphate formation.

The sorbent may be used to treat both liquid and gaseous fluid streams containing heavy metals, in particular fluids containing mercury and/or arsenic. In one embodiment, the fluid stream is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process of the invention, e.g. natural gas or refined paraffins or olefins, for example. Off-shore crude oil and off-shore natural gas streams in particular may be treated with the sorbent. Contaminated fuels such as petrol or diesel may also be treated. Alternatively, the hydrocarbon may be a condensate such as natural gas liquid (NGL) or liquefied petroleum gas (LPG), or gases such as a coal bed methane, landfill gas or biogas. Gaseous hydrocarbons, such as natural gas and associated gas are preferred.

Non-hydrocarbon fluid streams which may be treated include carbon dioxide, which may be used in enhanced oil recovery processes or in carbon capture and storage, solvents for decaffeination of coffee, flavour and fragrance extraction, solvent extraction of coal etc. Fluids, such as alcohols (including glycols) and ethers used in wash processes or drying processes (e.g. triethylene glycol, monoethylene glycol, Rectisol™, Purisol™ and methanol), may be treated by the inventive process. Mercury may also be removed from amine streams used in acid gas removal units. Natural oils and fats such as vegetable and fish oils may be treated, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

The sorbent is of utility where the fluid stream contains water, preferably in low levels in the range 0.02 to 1% vol. Higher levels up to 5% vol may be tolerated for short periods. The sorbents may be regenerated simply after prolonged exposure to water simply by purging with a dry gas, preferably a dry inert gas such as nitrogen.

Preferably the sorption of heavy metal is conducted at a temperature below 150° C., preferably at or below 120° C. in that at such temperatures the overall capacity for heavy metal absorption is increased. Temperatures as low as 4° C. may be used. A preferred temperature range is 10 to 60° C. The gas hourly space velocity through the sorbent may be in the range normally employed.

Furthermore, the sorbent may be used to treat both liquid and gaseous fluid streams containing one or more reductants such as hydrogen and/or carbon monoxide, notably hydrogen. In one embodiment, the fluid stream is a liquid hydrocarbon stream containing dissolved hydrogen and/or carbon monoxide. In another embodiment, the fluid stream is a gaseous stream containing hydrogen and/or carbon monoxide, i.e. a reducing gas stream. Gas streams that may benefit from this process include synthesis gas streams from conventional steam reforming processes and/or partial oxidation processes, and synthesis gas streams from a coal gasifier, e.g. as part of a IGCC process, after gas washing and heat recovery (cooling) steps, and before the sour shift stage. Other streams that may benefit from the present invention include refinery vent streams, refinery cracker streams, blast furnace gases, reducing gases, particularly hydrogen-rich gas streams, ethylene-rich streams and liquid or gaseous hydrocarbon streams, e.g. naphtha, fed or recovered from hydrotreating processes, such as hydrodesulphurisation or hydrodenitrification.

In use, the sorbent may be placed in a sorption vessel and the fluid stream containing heavy metal is passed through it. Desirably, the sorbent is placed in the vessel as one or more fixed beds according to known methods. More than one bed may be employed and the beds may be the same or different in composition.

The invention is further described by reference to the following Examples.

EXAMPLE 1. PREPARATION OF SORBENT

A dry powder mix was prepared according to the following recipe (all parts by weight).
139 parts copper sulphide, (reagent grade 99.8% CuS, $D_{50}$ 42 μm)
233 parts aluminium trihydrate ($D_{50}$ 10 μm)
64 parts Ciment Fondu (calcium aluminate)
64 parts Attagel 50 (attapulgite clay)

The dry powders were mixed to ensure homogeneity before employing a granulation technique where the mixed powder was combined with a little water and mixed to form granules in an Eirich mixer. The granules were dried immediately in a laboratory fluid bed drier at 105° C. The resulting dried sorbent product (Sorbent F) contained 27% wt copper sulphide (18% wt copper).

EXAMPLE 2. PREPARATION OF SORBENT

A dry powder mix was prepared according to the following recipe (all parts by weight).
139 parts copper sulphide, (CuS produced by reacting basic copper carbonate with hydrogen sulphide gas)
233 parts aluminium trihydrate ($D_{50}$ 10 μm)
64 parts Ciment Fondu (calcium aluminate)
64 parts Attagel 50 (attapulgite clay)

The dry powders were mixed to ensure homogeneity before employing a granulation technique where the mixed powder was combined with a little water and mixed to form granules in an Eirich mixer. The granules were dried immediately in a laboratory fluid bed drier at 105° C. The resulting dried sorbent product (Sorbent G) contained 27% wt copper sulphide (18% wt copper).

EXAMPLE 3. PREPARATION OF SORBENT

A dry powder mix was prepared according to the following recipe (all parts by weight).
139 parts copper sulphide, (CuS produced by mechano-chemical reactive milling of elemental copper and elemental sulphur, (CuS $D_{50}$ 11 μm)
233 parts aluminium trihydrate ($D_{50}$ 10 μm)
64 parts Ciment Fondu (calcium aluminate)
64 parts Attagel 50 (attapulgite clay)

The dry powders were mixed to ensure homogeneity before employing a granulation technique where the mixed powder was combined with a little water and mixed to form granules in an Eirich mixer. The granules were dried immediately in a laboratory fluid bed drier at 105° C. The resulting dried sorbent product (Sorbent H) contained 27% wt copper sulphide (18% wt copper).

EXAMPLE 4. GAS-PHASE TESTING

Sorbent F and a comparative sorbent prepared according to the 2-step post-sulphiding method described WO2009/101429 were tested. Granules of each sorbent (2.80-3.35 mm size fraction, volume 25 ml) were placed in a stainless steel reactor (21 mm ID). A flow of 100% vol natural gas was passed through a bubbler containing elemental mercury to allow the gas to pick up the mercury. The mercury-laden gas was then passed downwards through the reactor under the following conditions.

Pressure: 10 barg
Temperature 30° C.
Gas flow 110.2 NL·hr$^{-1}$
Contact time 8 seconds
Test duration 690 hours Samples from the reactor inlet and exit were periodically analysed for mercury content by atomic fluorescence detection. The inlet gas had a mercury concentration of about 1100 μg/m$^3$. The sorbents reduced the mercury content of the exit gas to below detectable limits throughout the test. At the end of each test the 25 ml sorbent bed was discharged as 9 discrete sub-beds which were ground completely and analysed by acid digestion/ICP-OES to determine total mercury content. The amount of mercury captured by each sorbent bed is shown in Table 1.

TABLE 1

|  |  | Sorbent F | Comparative Sorbent |
|---|---|---|---|
| Mercury Loading, wt % | Bed 1 (inlet) | 2.13 | 1.98 |
|  | Bed 2 | 1.15 | 1.56 |
|  | Bed 3 | 0.53 | 0.95 |
|  | Bed 4 | 0.37 | 0.46 |
|  | Bed 5 | 0.15 | 0.14 |
|  | Bed 6 | 0.06 | 0.05 |
|  | Bed 7 | 0.02 | 0.03 |
|  | Bed 8 | <0.01 | <0.01 |
|  | Bed 9 (exit) | <0.01 | <0.01 |

All sorbent F was surprisingly as effective for the removal of mercury as the sorbent prepared with a separate sulphiding step.

EXAMPLE 5. LIQUID-PHASE TESTING

Sorbents G and H and a comparative sorbent prepared according to the 2-step post-sulphiding method described WO2009/101429 were tested; Granules of each sorbent (1.00-2.00 mm size fraction, volume 25 ml) were placed in a glass reactor (19 mm ID). N-hexane liquid saturated with elemental mercury to ca. 1 ppm (w/v) was passed through the bed at ambient temperature (about 25° C.), at a Liquid Hourly Space Velocity (LHSV) of 7.0 hr$^{-1}$. Samples were taken from the reactor exit line and analysed by atomic fluorescence on a PSA-modified Hewlett Packard 6890 GC to monitor mercury levels. At the end of the test (750 hours), the bed was discharged into 9 equivalent discrete sub-beds by vacuum, which were analysed for total mercury content (w/w) by ICP-Optical Emission Spectroscopy.

|  | Sorbent G | Sorbent H | Comparative Sorbent |
| --- | --- | --- | --- |
| Mercury Loading, wt % Bed 1 (inlet) | 2.89 | 3.38 | 4.57 |
| Bed 2 | 1.23 | 1.52 | 1.28 |
| Bed 3 | 0.27 | 0.30 | 0.24 |
| Bed 4 | 0.07 | 0.07 | 0.03 |
| Bed 5 | 0.02 | <0.01 | <0.01 |
| Bed 6 | <0.01 | <0.01 | <0.01 |
| Bed 7 | <0.01 | <0.01 | <0.01 |
| Bed 8 | <0.01 | <0.01 | <0.01 |
| Bed 9 (exit) | <0.01 | <0.01 | <0.01 |

Sorbents G and H were surprisingly as effective for the removal of mercury as the sorbent prepared with a separate sulphiding step.

The invention claimed is:

1. A method for preparing a sorbent comprising the steps of:
   (i) mixing a particulate copper sulphide material, a particulate support material and one or more binders to form a mixture,
   (ii) shaping the mixture by granulating the mixture in a granulator, and
   (iii) drying the shaped mixture to form a dried sorbent, and
   wherein the shaping comprises granulating the mixture in a granulator using a liquid and the amount of liquid is 0.1 to 0.5 mL/g of mixture.

2. The method according to claim 1 wherein the particulate copper sulphide material is manufactured by roasting copper or a copper compound with elemental sulphur, precipitating copper sulphide from solution, sulphiding a copper compound using hydrogen sulphide, or mixing powdered copper metal with elemental sulphur under conditions that cause the elemental copper and elemental sulphur to react to form one or more copper sulphides.

3. The method according to claim 1 wherein the copper sulphide comprises one or more copper sulphides that are copper (II) sulphide, CuS, or substoichiometric copper sulphides of formula $Cu_{2-x}S$ where x is 0-1.

4. The method according to claim 1 wherein the particulate copper sulphide has an overall S:Cu atomic ratio of ≥0.8.

5. The method according to claim 4 wherein the particulate copper sulphide has an overall S:Cu atomic ratio of ≥0.9.

6. The method according to claim 4 wherein the particulate copper sulphide has an overall S:Cu atomic ratio of ≥0.95.

7. The method according to claim 1 wherein the particulate copper sulphide material is in the form of a powder with an average particle size, $[D_{50}]$, in the range 5-100 μm.

8. The method according to claim 7, wherein the particulate copper sulphide material is in the form of a powder with a $D_{50}$ in the range of 10-50 μm.

9. The method according to claim 1 wherein the copper content of the dried sorbent is in the range 10-75% by weight, expressed as CuS.

10. The method according to claim 9 wherein the copper content of the dried sorbent is in the range of 15-50% by weight.

11. The method according to claim 1 wherein the particulate support material is alumina, hydrated alumina, titania, zirconia, silica, aluminosilicate, or a mixture thereof.

12. The method according to claim 1 wherein the dried sorbent comprises 20-60% by weight of the particulate support material.

13. The method according to claim 1 wherein the binder is a clay binder, cement binder, or organic polymer binder.

14. The method according to claim 1 wherein the binder is a combination of a cement binder and a clay binder.

15. The method according to claim 14 wherein the relative weights of the cement binder and clay binder is in the range of 1:1 to 3:1.

16. The method according to claim 1 wherein the total amount of the binder in the dried sorbent is in the range of 5-30% by weight.

17. The method according to claim 1 wherein the total metal sulphide content of the sorbent, other than copper sulphide, is ≤5% wt.

18. The method according to claim 1 wherein the sorbent is dried at a temperature up to 120° C.

19. The method according to claim 1 wherein the total metal sulphide content of the sorbent, other than copper sulphide, is ≤1% wt.

* * * * *